United States Patent
Chin

[15] 3,677,573
[45] July 18, 1972

[54] PHOTOGRAPHIC EQUIPMENT CART

[72] Inventor: Sonny B. Chin, 5750 Charles St., Burnaby, British Columbia, Canada

[22] Filed: Sept. 25, 1970

[21] Appl. No.: 75,354

[52] U.S. Cl. ........................ 280/43.1, 280/43.24, 280/47.24
[51] Int. Cl. ................................. B62b 1/10, B62d 61/12
[58] Field of Search ...................... 280/5.26, 43, 43.1, 43.14, 280/43.17, 43.24, 47.17, 47.24, 47.26, 47.27, 47.29, 47.37 R, 150 A

[56] References Cited

UNITED STATES PATENTS

| | | | |
|---|---|---|---|
| 2,747,883 | 5/1956 | Frost | 280/5.26 |
| 3,041,026 | 6/1962 | Wilson | 280/47.24 X |
| 3,116,069 | 12/1963 | Dastal | 280/47.37 R X |
| 2,616,720 | 11/1952 | Knoth | 280/43.1 |
| 2,633,363 | 3/1953 | Marshall | 280/5.26 |
| 2,607,396 | 8/1952 | Stambaugh | 280/47.37 R X |
| 2,984,499 | 5/1961 | Humphrey | 280/47.24 X |

FOREIGN PATENTS OR APPLICATIONS

| | | | |
|---|---|---|---|
| 1,117,175 | 6/1968 | Great Britain | 280/5.26 |

*Primary Examiner*—Benjamin Hersh
*Assistant Examiner*—Leslie J. Paperner
*Attorney*—Fetherstonhaugh & Co.

[57] ABSTRACT

A cart having two sets of wheels which are interchangeable, one set for another, so that the cart can readily be converted from outdoor use to indoor use and vice versa. The cart is capable of transporting equipment such as that used by a photographer and also providing a steady base for the camera mount. Parts of the cart are foldable and others collapsible for convenience in storing the cart in a confined space.

10 Claims, 6 Drawing Figures

Patented July 18, 1972

INVENTOR
SONNY B. CHIN
BY
Fetherstonhaugh & Co.
ATTORNEYS

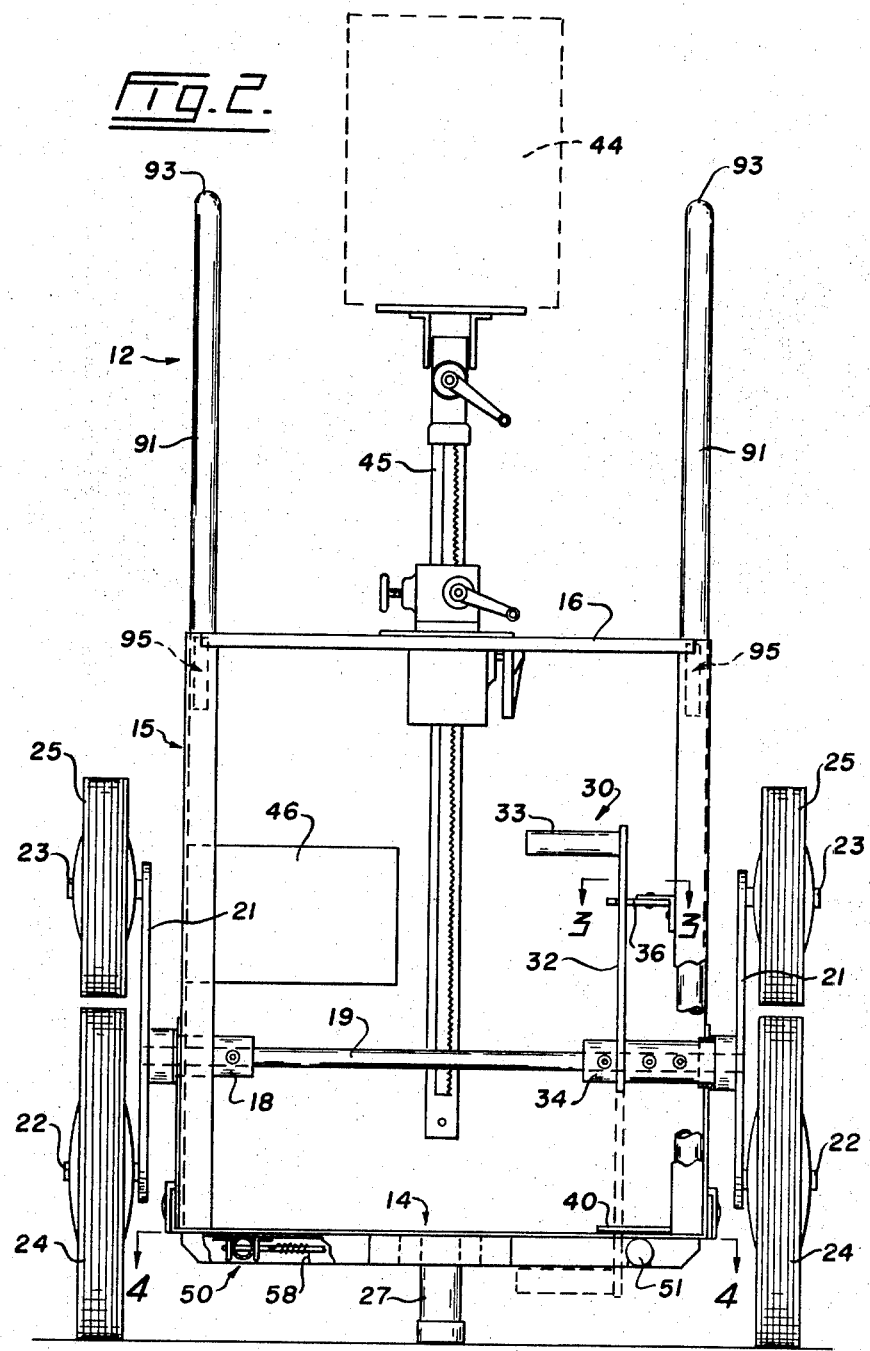

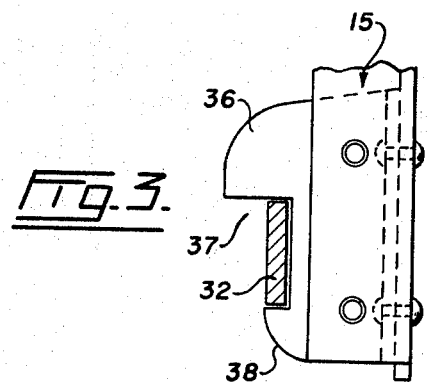
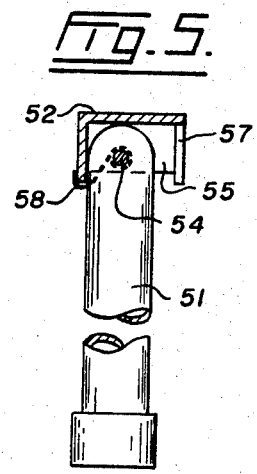
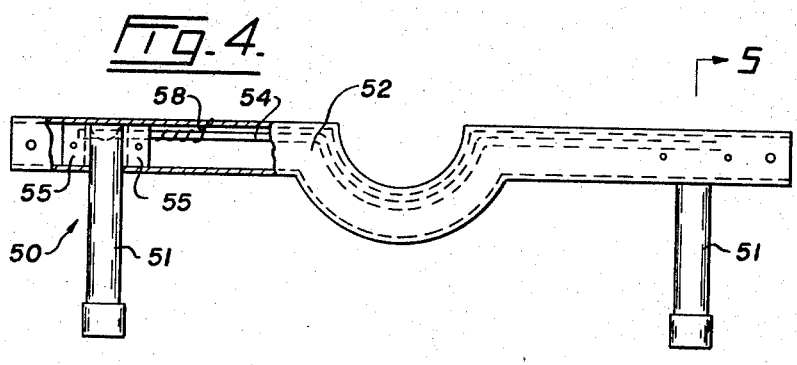
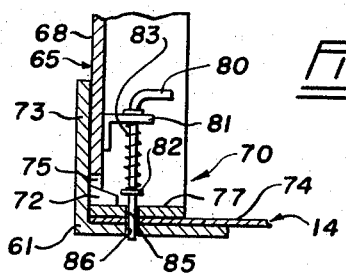

PHOTOGRAPHIC EQUIPMENT CART

My invention relates generally to carts and more particularly to a wheeled mobile camera stand and equipment cart.

A photographer who must leave his studio to go out on a photographic assignment usually is faced with the problem of loading his equipment into his car or truck and later transferring the equipment from the vehicle into a home or other building where the photographing is to be done. Carts presently available for this purpose have a number of disadvantages which are strongly objected to by many photographers. For example, conventional carts take up a considerable amount of space by themselves and cannot conveniently be loaded into the luggage compartments of some cars. More importantly, the wheels of any cart can become dirtied at some stage of the trip particularly if the weather is wet and the ground muddy. The dirtied wheels either must be cleaned before entering the house or the cart must be left at the door which leaves the photographer without means of moving his equipment about the house or supporting his camera in position of use.

I have overcome these and other disadvantages of conventional carts by providing one which has two sets of wheels. Means are provided on the cart whereby one set of wheels which may have become soiled in transit, can readily by swung out of harm's way while the other clean set of wheels is swung into a cart-supporting position. All the equipment normally needed by a photographer can be carried by the cart which also provides a steady base for supporting the camera during the picture-taking session. The cart can be folded to reduce the length and collapsed to shorten the height whereby it will easily fit into the baggage compartment of even a small car.

In drawings which illustrated a preferred embodiment of the invention,

FIG. 2 is a rear elevation,

FIG. 3 is a section taken on the line 3—3 of FIG. 2,

FIG. 4 is a view taken on the line 4—4 of FIG. 2,

FIG. 5 is an enlarged section taken on the line 5—5 of FIG. 4, and

FIG. 6 is a section taken on the line 6—6 of FIG. 1.

Figure 1:
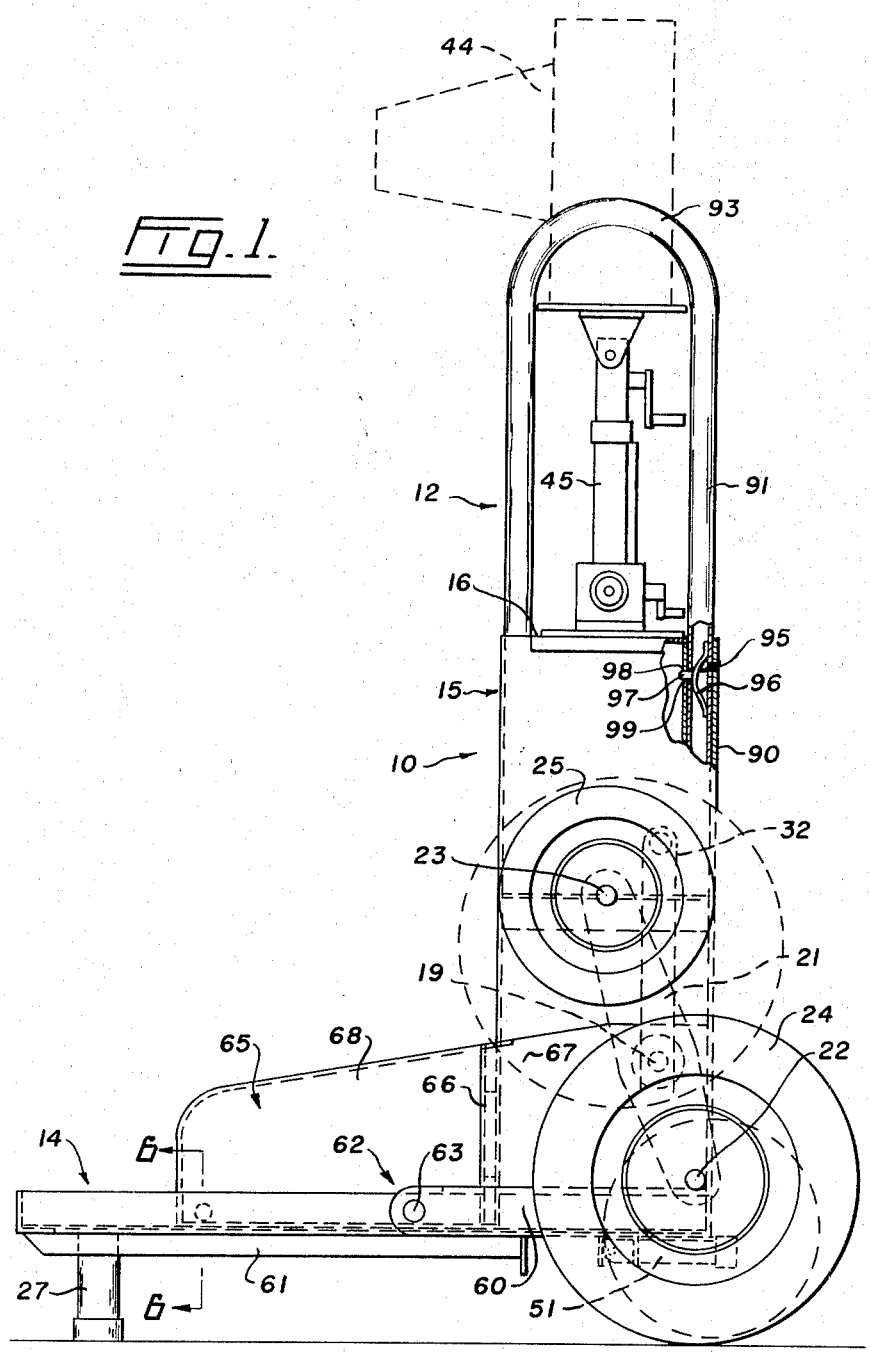
FIG. 1 is a side elevation of the cart.

Referring to the drawings, the cart which is generally indicated by the numeral 10 is provided with a frame 12 preferably constructed of aluminum for lightness and strength. Frame 12 includes a platform 14 and a pair of spaced side members 15. The upwardly extending and elongated side members 15 are cross-connected intermediate their length by a horizontal bar 16.

Near the platform 14, the side members 15 are fitted with bearings 18 and journalled in these bearings is an axle 19. The opposite ends of axle 19 project through the side members 15 and the bearings 18, these outwardly projecting axle ends each being fitted with an arm 21 which is spaced a short distance from and extends parallel to the adjacent side member. Laterally projecting pairs of spindles 22 and 23 are fitted to opposite ends of the arms 21 and rotatably mounted on these spindles are large main wheels 24 and small auxiliary wheels 25 respectively. Normally the main wheels 24 engage the surface of the ground to support the platform 14 a short distance thereabove and, near the front edge of said platform, a short leg 27 is provided to additionally support the platform in a horizontal position, at which time the side members 15 are substantially vertical.

At times the auxiliary wheels 25 are used to roll the cart rather than the normally used main wheels 24 and, in order to swing one pair or the other of wheels into operating position, the cart is provided with change means 30. As shown, the manually operable change means 30 comprises a vertically disposed lever 32 which is located alongside one of the side members 15. Lever 32 has a horizontal handle 33 at one end and a sleeve 34 at the other end, the sleeve being suitably locked to the axle 19. By use of the lever 32, the positions of the two pairs of wheels can be reversed from that shown in the drawings. In other words, when lever 32 is in the solid line position shown in FIG. 2, the large main wheels are in contact with the ground and support the cart with the assistance of the front leg 27, assuming said cart is stationary. When lever 32 is swung to the dotted line position of FIG. 2, the positions of the wheels 24 and 25 are interchanged as indicated by the dotted lines in FIG. 1.

The lever 32 is adapted to be held in one of the two above described operating positions by an upper latch plate 36 which is secured to a side member 15 to project inwardly thereof. As shown in FIG. 3, the upper latch plate 36 has a side notch 37 in which the lever 32 normally is lodged. A cam face 38 is formed in the plate 36 to lead into the notch 37 and the lever 32 has sufficient resilience to enable it to be bent inwardly a distance slightly greater than the radius of said cam face. When the lever 32 is swung upwardly in a counter clockwise direction (FIG. 1), the leading edge of said lever engages the cam face 38 whereupon the lever is bent inwardly so as to snap into the notch 37. This locks the lever 32 to the frame 12 with the main wheels 24 in contact with the ground and disposed slightly to the rear of the cart as shown in FIG. 1. The spindles 22 then are opposite the rear edges of the side members 15, the spindles 23 at this time are centered relative to said side members, and the arms 21 are inclined forwardly as shown best in FIG. 1. This arrangement resists any tendency of the cart to overbalance and fall rearwardly when fully loaded, the leg 27 preventing the cart from tilting forward beyond the normally upright position shown in FIG. 1.

A lower latch plate 40, see FIG. 2 only, is provided on the frame 12 above the platform 14 and directly below the upper latch plate 36. Since latch plate 40 is of the same construction as plate 36 (see particularly FIG. 3) a detailed description is not considered necessary, the former latch plate functioning in the same manner as before to hold the lever 32 in its alternative operating position. Lever 32 is adapted to be sprung out of engagement with the upper latch plate 36, then swung rearwardly and downwardly through 180° into engagement with the lower latch plate 40, this lever movement normally being executed when the cart is tilted forwardly on to the leg 27. Thus, the auxiliary wheels 25 are moved into the ground engaging position formerly occupied by the main wheels 24. It will be noted that the axle 19 if not centered with respect to opposite ends of the arms 21, see FIG. 2. This off center position of the arms 21 causes the small pair of auxiliary wheels 25 to swing through an arc of a larger radius than the arc described by the large pair of main wheels 24 whereupon the platform 14 is supported in the same level position regardless of what wheels are engaging the ground.

The cart 10 is designed particularly to carry photographic equipment including a camera 44 which is mounted on a pod 45. This conventionally constructed pod 45 is mounted on the cross bar 16 of the frame and the pod is the type which will enable the camera 44 to be raised and lowered as required and also turn in a horizontal plane and tilt in a vertical plane. The camera 44 can be removed from the pod 45 and stored on the platform 14 along with the lights, batteries, etc., required by a photographer, this equipment not being shown in the drawings. Preferably, frame 12 is provided with containers or the like, one of which is indicated by the numeral 46 in FIG. 2 and the film holders and other small items which form part of a photographers equipment are stored in such containers.

The cart 10 is of lightweight but sturdy construction and therefore it is quite a simple matter normally to tilt it forward on to leg 27 so that the wheels 24 and 25 can interchange by operation of the means 30. However, when the cart is fully loaded with heavy photographers or other equipment, some difficulty might be experienced in raising the rear of the cart and balancing it on the leg 27 and to overcome this difficulty I provide the device with a stand generally indicated at 50. As shown in the drawings, the stand 50 comprises a pair of transversely spaced legs 51 which are carried by a frame member 52 extending between the side members 15 at the rear of the cart, see particularly FIGS. 4 and 5. The legs 51 are secured to opposite ends of a rod 54 which is housed within the channel member 52. Brackets 55 are provided within the member 52 to journal the opposite ends of the rod 54 so that said rod is free to rotate. Thus the legs 51, which are fixedly mounted on the rod 54, can swing from a horizontal or stored position (FIG. 1 for example) to a vertical position of use as shown in FIG. 5, which enable the legs 51 to project rearwardly (FIG. 1) when in the stored or out-of-the-way position. A stout tension spring 58, see FIGS. 2 and 5, encircles the rod 54 and one end of this spring is fixed to said rod while the opposite end is hooked under the frame member 52. This spring 58 provides means for biasing the stand 50 towards the normally assumed position wherein the legs 51 are horizontal.

To lower the stand 50, the photographer takes up a position to the rear of the cart and pushes forward on the side members 15 to balance the cart on the leg 27. He then uses one foot to kick the stand 50 down to an operating position where the legs 51 are substantially vertical whereupon the card is lowered on to be supported entirely by the legs 27 and 51. Leg 51 are slightly longer than the legs 27 and therefore the cart 10 will be tilted forwardly with the lowermost set of wheels clear of the ground. The operator can there select the wheels he wants to use and swing them into a position just clear of the ground without being required to balance the cart as he does so. Once the selected set of wheels are in position, the cart is pushed forwardly once again and the spring 58 snaps the legs 51 up to their normal horizontal position. The cart 10 is then lowered on to the wheels and is ready to roll.

A photographer who is called to a private home to photograph a family group for example, can use the cart 10 to carry his equipment indoors. If the main wheels are dirtied during the trip as so often happens, the photographer simply changes over to the auxiliary wheels 25 just before he enters the home. This change-over can be done quickly and easily simply by tilting the still fully loaded cart 10 forward on the leg 27 and using the kick-stand 50 to support the rear of the cart while the lever 32 is operated to substitute the small pair of wheels 25 for the large pair of wheels 24. The cart can then be moved over carpets and other areas while rolling along on the clean auxiliary wheels 25 with the dirty wheels 24 being up out of harm's way. The cart 10 provides a steady support for the camera 44 as the pictures are taken and, at the same time, the photographer has all his equipment within arm's length.

When a private automobile is used to transport the loaded cart 10 from place to place, it may be found that the luggage compartment of the car is not large enough to accommodate such a load but I have overcome this difficulty by making the photographic equipment cart so that it is foldable and collapsible. Referring now to FIGS. 1 and 6, the platform 14 will be seen to comprise an inner portion 60 and an outer portion 61 which are connected together by hinge means 62 comprising a pair of transversely extending hinge bolts 63. Portion 60 is fixedly secured to the side members 15 and portion 61 is adapted to be swung upwardly and rearwardly about the transverse axis of the hinge bolts 63 into contact with the front edges of the side members 15.

Platform 14 is provided with side plates 65 which are divided by vertically disposed hinges 66 into a fixed inner portion 67 and a horizontally swingable outer portion 68. The portions 68 of the two side plates are adapted to be swung inwardly towards each other until they are positioned alongside the front edges of the side members 15, this folding of the side portions being done before the outer portion 61 of the platform is folded upwardly as described above. Thus the overall length of the cart can be reduced to substantially one-half the length of the cart in normal position of use.

Referring now to FIG. 6, the numeral 70 indicates generally locking means for securing the platform 14 in the unfolded position. As illustrated, locking means 70 includes a pair of stops 72 (one only shown) which project inwardly from the sides of a U-shaped length of angle 73 used to form a frame for the portion 61. The stops 73 are spaced a short distance above a deck panel 74 supported by the angle 73. Each stop 73 projects through an opening 75 formed in the adjacent side plate 65 so as to engage a bottom part 77 thereof. The outer portion 61 of the platform and the side plates 65 are prevented from separating vertically by means of the stops 72.

In order to releasably secure the portions 68 side plates to the platform 14, the locking means 70 is provided with a pair of latch pins 80, one only being shown in FIG. 5. Each of the vertically movable latch pins 80 is mounted in a bracket 81 carried by a side plate 68. A collar 82 is fitted to the pin 80 and a spring 83 is interposed between said collar and the bracket 81 to urge the pin downwardly. Openings 85 and 86 are provided in the portions 68 of the side plates and the platform portion 61 respectively and, when these openings are vertically aligned, the pin 80 is snapped into the aligned openings to lock the side plates 65 to the platform 14.

The side members 15 each comprise a pair of lower posts 90 and a pair of upper posts 91 which are telescoped together as shown best in FIG. 1. The upper posts 91 are connected by a bend which forms a U-shaped handle 93. Catch means generally indicated at 95 in FIGS. 1 and 2 is provided for securing the upper posts of each side member 15 in the extended position. The lower end of one upper post 91 of each side member is fitted with a leaf-spring 96 which carries a catch button 97, these parts comprising the catch means 95. This catch button 97 is adapted to project through horizontally aligned openings 98 and 99 (FIG. 1) formed in the telescoping posts when the side members are fully extended. To collapse the side members 15, the catch buttons 97 are pressed inwardly whereupon the upper posts 91 can be telescoped into the lower posts 90. When the handles 93 are positioned immediately above the crossbar 16, it will be found that the height of the cart 10 has been reduced by approximately one-half.

From the foregoing, it will be apparent I have provided a cart which is extremely useful to a photographer required to leave his studio on a photographic assignment with all the necessary equipment for the job. Hitherto, much of this equipment was carried by the photographer at least at some stages of the trip and this heavy work has been eliminated by the present cart. The readily foldable cart provides the camera with a perfectly steady base which can be wheeled about to any required position all the usual camera attachments and the like are stored on the cart at the photographers finger tips. Since the cart has dual sets of wheels, it can be used outdoors and later converted so that it can be moved indoors without danger of soiling rugs or other floor coverings.

What is claimed is:

1. A cart for transporting photographic equipment or the like comprising a frame having a platform and side members, an axle rotatably mounted in the frame near the platform and having opposite ends projecting laterally of the side members, an arm secured to each opposite end of the axle for swinging movement in a vertical plane, a first and second pair of spindles mounted on opposite ends of the arms, a pair of main wheels journalled on the first pair of spindles, a pair of auxiliary wheels journalled on the second pair of spindles, manually operable change means for rotating the axle whereby to selectively swing the main wheels or the auxiliary wheels into cart supporting engagement with the surface of the ground, first latch means for securing the manually operable change means to the frame with the main wheels in contact with the ground, and second latch means for securing the manually operable change means to the frame with the auxiliary wheels in contact with the ground.

2. A cart for transporting photographic equipment or the like comprising a frame having a platform and side members, an axle rotatably mounted in the frame near the platform and having opposite ends projecting laterally of the side members, an arm secured to each opposite end of the axle for swinging movement in a vertical plane, a first and a second pair of spindles mounted on opposite ends of the arms, a pair of main wheels journalled on the first pair of spindles, a pair of auxiliary wheels journalled on the second pair of spindles, manually operable change means for rotating the axle whereby to selectively swing the main wheels or the auxiliary wheels into cart supporting engagement with the surface of the ground, and a stand mounted on the frame for movement to a ground engaging position whereby to support said frame elevated above the surface of the ground a distance greater than the maximum arc of swing of the main and auxiliary wheels.

3. A cart as claimed in claim 2, and including hinge means for folding the platform substantially into parallelism with the side members.

4. A cart as claimed in claim 3, and including locking means for securing the platform in the unfolded position.

5. A cart as claimed in claim 2, in which said side members each comprise upper and lower posts, and catch means for securing the upper posts of each side member in the extended position.

6. A cart as claimed in claim 2, in which said manually operable change means includes a lever having two operating positions, and a latch plate carried by the frame for engagement by the lever in each operating position.

7. A cart for transporting photographic equipment or the like comprising a platform and side members, a leg on the platform near the forward edge thereof, an axle rotatably mounted in the frame near the rearward edge of the platform and having opposite ends projecting laterally of the side members, an arm secured to each opposite end of the axle for swinging movement in a vertical plane, a first and a second pair of spindles mounted on opposite ends of the arms, a pair of main wheels journalled on the first pair of spindles, a pair of auxiliary wheels journalled on the second pair of spindles, a lever secured to the axle for swinging either the main or auxiliary wheels into a ground engaging position, a first latch plate carried by the frame for engagement by the lever when the main wheels are in ground-engaging position, and a second latch plate carried by the frame for engagement by the lever when the auxiliary wheels are in ground-engaging position.

8. A cart as claimed in claim 7, and including a stand mounted on the frame for movement between a stored position and a position of use, and spring means biasing the stand towards the stored position.

9. A cart as claimed in claim 7, in which said platform comprises an inner portion and an outer portion hingedly connected together whereby said outer portion is swingable about a transverse axis to a substantially upright position, side plates carried by the frame above on the platform and having inner and outer portions hingedly connected together whereby said outer portions are swingable about vertical axes to folded positions alongside the platform outer portion in the upright position, and locking means for securing the outer portions of the side plates to the platform outer portion.

10. A cart as claimed in claim 9, in which said side members each comprise telescoping upper and lower posts, and catch means for securing the upper posts of each side member in the extended position.

* * * * *